United States Patent
Cheon et al.

(10) Patent No.: US 7,667,202 B2
(45) Date of Patent: Feb. 23, 2010

(54) MULTILAYER-STRUCTURED BOLOMETER AND METHOD OF FABRICATING THE SAME

(75) Inventors: Sang Hoon Cheon, Daejeon (KR); Ho Jun Ryu, Seoul (KR); Woo Seok Yang, Daejeon (KR); Seong Mok Cho, Daejeon (KR); Byoung Gon Yu, Daejeon (KR); Chang Auck Choi, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 0 days.

(21) Appl. No.: 12/182,456

(22) Filed: Jul. 30, 2008

(65) Prior Publication Data

US 2009/0152467 A1    Jun. 18, 2009

(30) Foreign Application Priority Data

Dec. 18, 2007    (KR)    ...................... 10-2007-0133497

(51) Int. Cl.
G01J 5/20    (2006.01)
(52) U.S. Cl. ............................. 250/338.4; 257/E21.001
(58) Field of Classification Search .............. 250/338.1, 250/338.4, 338.5, 332, 238, 208.1; 257/E27.136, 257/E27.143, E21.001
See application file for complete search history.

(56) References Cited

U.S. PATENT DOCUMENTS 6,144,030 A    11/2000    Ray et al.
6,307,194 B1    10/2001    Fitzgibbons et al.
6,690,014 B1 *   2/2004    Gooch et al. ............. 250/338.4

FOREIGN PATENT DOCUMENTS

JP    10-332480    12/1998

OTHER PUBLICATIONS

Murphy et al., "640×512 17 μm microbolometer FPA and sensor development", Infrared Technology and Applications XXXIII, Proceedings of the SPIE, vol. 6542, No. 65421Z, 2007, p. 1-10.
Li et al., "Recent development of ultra small pixel uncooled focal plane arrays at DRS", Infrared Technology and Applications XXXIII, Proceedings of the SPIE, vol. 6542, No. 65421Y, 2007, p. 1-12.

* cited by examiner

*Primary Examiner*—David P Porta
*Assistant Examiner*—Faye Boosalis
(74) *Attorney, Agent, or Firm*—Rabin & Berdo, P.C.

(57) ABSTRACT

Provided are a multilayer-structured bolometer and a method of fabricating the same. In the multilayer-structured bolometer, the number of support arms supporting the body of a sensor structure is reduced to one, and two electrodes are formed on the one support arm. Thus, the sensor structure is electrically connected with a substrate through the only one support arm. According to the multilayer-structured bolometer and method of fabricating the bolometer, the thermal conductivity of the sensor structure is considerably reduced to remarkably improve sensitivity to temperature, and also the pixel size of the bolometer is reduced to obtain high-resolution thermal images. In addition, the multilayer-structured bolometer can have a high fill-factor due to a sufficiently large infrared-absorbing layer, and thus can improve infrared absorbance.

18 Claims, 7 Drawing Sheets

MULTILAYER-STRUCTURED BOLOMETER AND METHOD OF FABRICATING THE SAME

CROSS-REFERENCE TO RELATED APPLICATION

This application claims priority to and the benefit of Korean Patent Application No. 2007-133497, filed Dec. 18, 2007, the disclosure of which is incorporated herein by reference in its entirety.

BACKGROUND

1. Field of the Invention

The present invention relates to a multilayer-structured bolometer and method of fabricating the same, and more particularly, to a multilayer-structured bolometer that has one support arm supporting the body of a sensor structure and two electrodes formed on the support arm and thus can be electrically connected with a substrate through the only one support arm and a method of fabricating the multilayer-structured bolometer.

This work was supported by the IT R&D program of MIC/IITA. [2006-S054-02; Development of CMOS-based MEMS Combined Sensor Technology for Ubiquitous Terminal]

2. Discussion of Related Art

Infrared sensors are classified into a cooled type operating at liquid-nitrogen temperature and an uncooled type operating at normal temperature. The cooled infrared sensors sense electron-hole pairs generated when semiconductor material having small bandgap, such as HgCdTe, absorbs infrared rays using a photoconductor, a photodiode and a photocapacitor. On the other hand, the uncooled infrared sensors sense conductivity or capacitance changed by heat generated when infrared rays are absorbed, and are generally classified into a pyroelectric type, a thermopile type and a bolometer type. The uncooled infrared sensors have a lower sensitivity to infrared rays than the cooled infrared sensors, but do not need an additional cooling device. Thus, the uncooled infrared sensor has a small size, consumes little power, is low priced, and thus is used in various fields.

A most frequently used bolometer among uncooled infrared sensors detects an increase in the resistance of a thin metal film, such as Ti, caused by heat generated when infrared rays are absorbed, or a reduction in the resistance of a semiconductor thin film, such as $VO_x$ and amorphous Si, thereby sensing infrared rays. In a bolometer, a resistive thin film, i.e., a resistive layer, is formed on a sensor structure floated by a specific height from a substrate in which an infrared detection circuit is formed. The resistive thin film is formed apart from the substrate by a specific height in order to isolate heat of the substrate and effectively sense heat generated when infrared rays are absorbed.

Figure 1A:
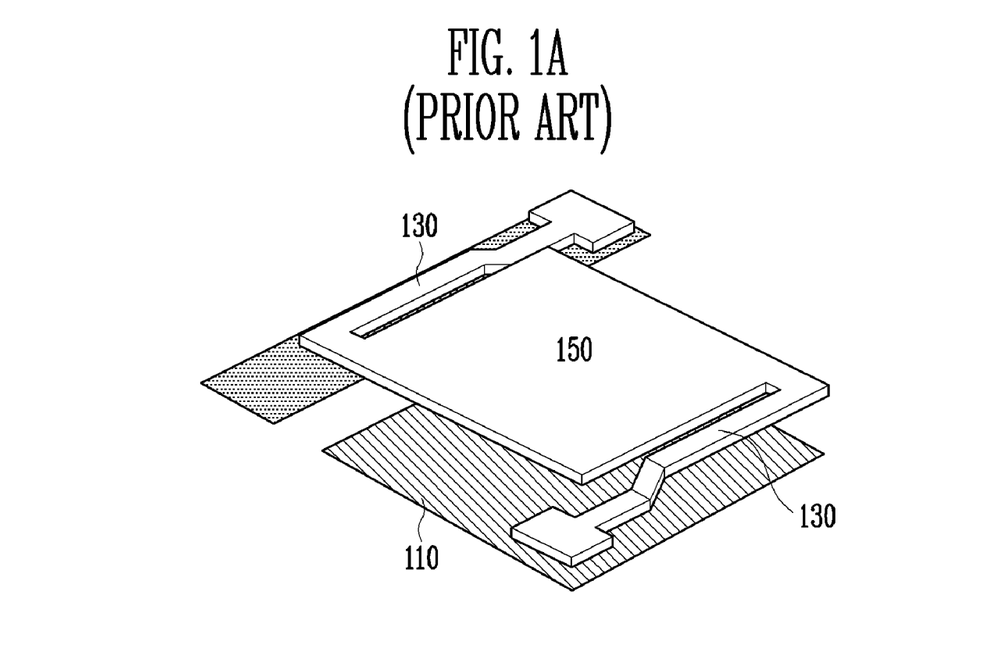
FIGS. 1A to 1C are perspective views of conventional bolometers.
Figure 1B:
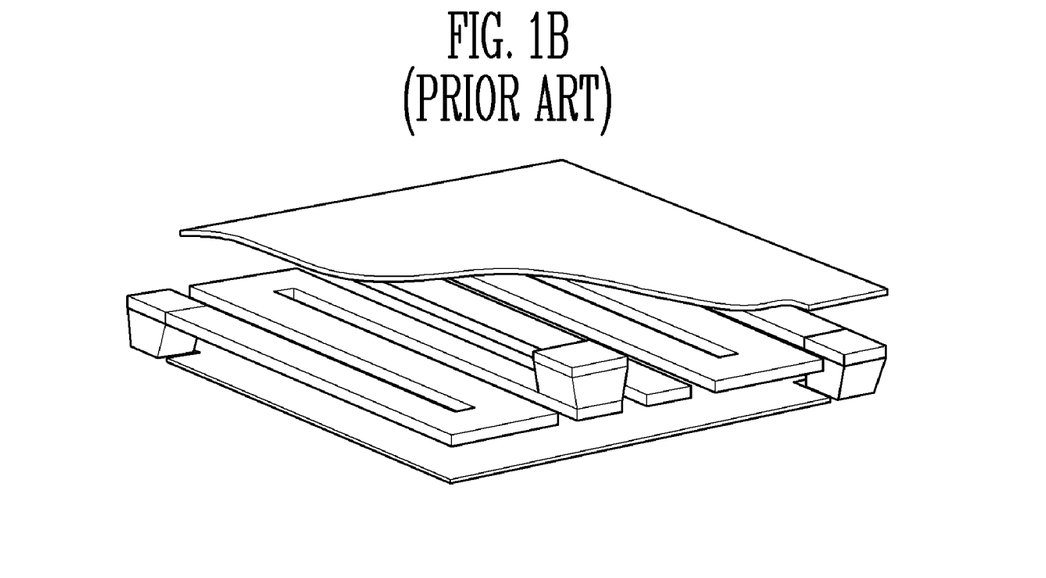
Figure 1C:
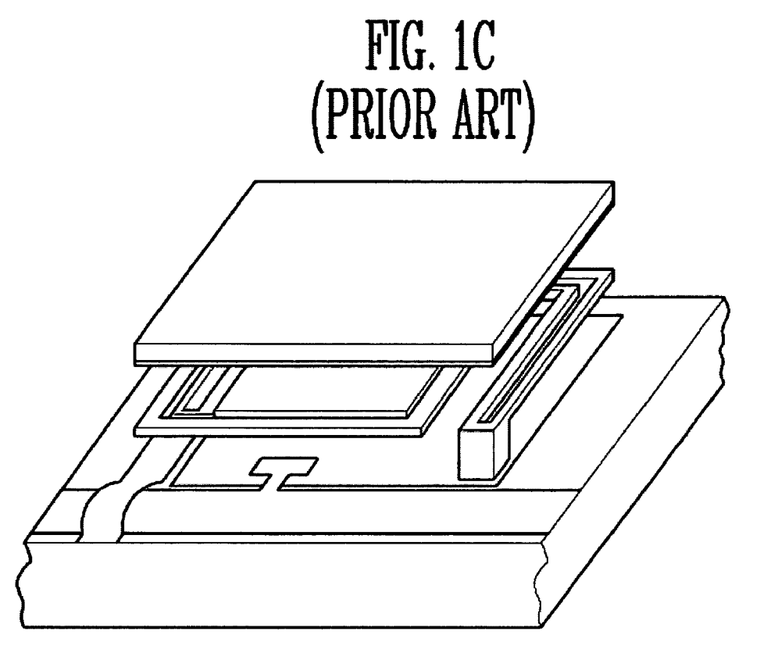

FIGS. 1A to 1C are perspective views of conventional bolometers.

Referring to FIG. 1A, a conventional bolometer includes a substrate 110 including a detection circuit (not shown), and a sensor structure 150 floated from the substrate 110 by a height of $\lambda/4$ ($\lambda$: infrared wavelength).

The sensor structure 150 is fixed on the substrate 110 by support arms 130 coupled to both edges thereof. Here, the support arms 130 prevent heat from leaking from the sensor structure 150 to the substrate 110.

In the bolometer as constituted above, the sensor structure 150 must have high infrared absorbance, high thermal isolation and low heat capacity to prevent heat generated upon infrared absorption from leaking to the substrate 110 and to rapidly sense the generated heat.

For these reasons, the bolometer must be constituted to have a two-layer structure as shown in FIG. 1A or a multilayer structure as shown in FIGS. 1B and 1C to intercept heat and increase infrared absorbance.

However, in a two-layer structure as shown in FIG. 1A, support arms cannot absorb infrared rays, and thus infrared absorbance deteriorates.

On the other hand, in multilayer-structured bolometers as shown in FIGS. 1B and 1C, an infrared-absorbing layer can be formed sufficiently large, and support arms for heat separation can be formed sufficiently long. Thus, multilayer-structured bolometers have better characteristics. In addition, when a unit pixel size is reduced in a bolometer array for infrared images, optical characteristics of an existing pixel do not deteriorate.

However, in multilayer structures as shown in FIGS. 1B and 1C, all support arms supporting a sensor structure are electrically connected to a lower substrate. Therefore, the pixel size of the bolometer as well as thermal conductivity increases.

SUMMARY OF THE INVENTION

The present invention is directed to significantly reducing thermal conductivity of a sensor structure and remarkably improving sensitivity to temperature by reducing the number of support arms supporting the body of a sensor structure to one and electrically connecting the sensor structure with a substrate through the only one support arm, and also obtaining high-resolution thermal images by reducing the pixel size of a bolometer.

One aspect of the present invention provides a multilayer-structured bolometer, comprising: a semiconductor substrate including a detection circuit therein; first and second metal pads formed on the semiconductor substrate; and a sensor structure disposed apart from the first and second metal pads by a quarter of an infrared wavelength above the semiconductor substrate. Here, the sensor structure includes: a body disposed above the first and second metal pads, and including a resistance layer having a resistance varying according to a change in temperature caused when infrared rays are absorbed; and one support arm constituted to have a two-layer structure of an upper stage and a lower stage, and electrically connected with the body and the first and second metal pads.

The lower stage of the support arm may include first and second electrodes respectively connected with the first and second metal pads, and first to third insulating layers for insulation between the first and second electrodes. The upper stage of the support arm may include the resistive layer having a resistance varying according to a change in temperature caused when infrared rays are absorbed, fourth and fifth insulating layers for insulating the resistive layer, and third and fourth electrodes for respectively transferring a change in the resistance of the resistive layer to the first and second electrodes.

The resistive layer may be formed of one of Si, $VO_x$ or Ti. When the resistive layer is formed of Si, the body may include an absorption layer for absorbing infrared rays.

Another aspect of the present invention provides a method of fabricating a multilayer-structured bolometer, comprising: forming first and second metal pads on a substrate including a detection circuit; forming a first sacrificial layer on the substrate to expose the first and second metal pads, and then forming first and second electrodes electrically connected with the first and second metal pads and first to third insulating layers for insulating the first and second electrodes on the first sacrificial layer; forming a second sacrificial layer on the third insulating layer to expose a region to be connected with a body of a sensor structure, and then forming on the second sacrificial layer a resistive layer having a resistance varying according to a change in temperature caused when infrared rays are absorbed, fourth and fifth insulating layers for insulating the resistive layer, and third and fourth electrodes for respectively transferring a change in the resistance of the resistive layer to the first and second electrodes; and etching the first sacrificial layer and the second sacrificial layer.

The substrate may be formed of semiconductor Si. The first and second metal pads may be formed of Al. The first and second sacrificial layers may be formed of Benzocyclobutene (BCB) or polyimide.

The resistive layer may be formed of one of Si, VOx or Ti having resistances varying according to a change in temperature. When the resistive layer is formed of Si, the method may further comprise, after forming the second sacrificial layer and before etching the first sacrificial layer and the second sacrificial layer, forming an absorption layer surrounded by a sixth insulating layer on the fifth insulating layer.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention. Throughout the drawings and the following descriptions of exemplary embodiments, like numerals denote like elements. In the drawings, the sizes and thicknesses of layers and regions may be exaggerated for clarity.

Figure 2:
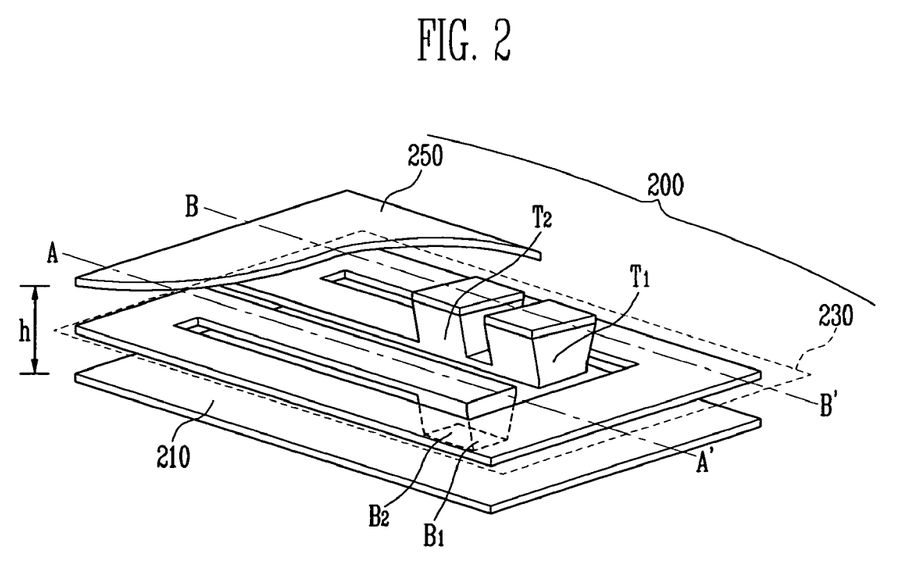
FIG. 2 is a perspective view of a multilayer-structured bolometer according to an exemplary embodiment of the present invention.
Figure 3:
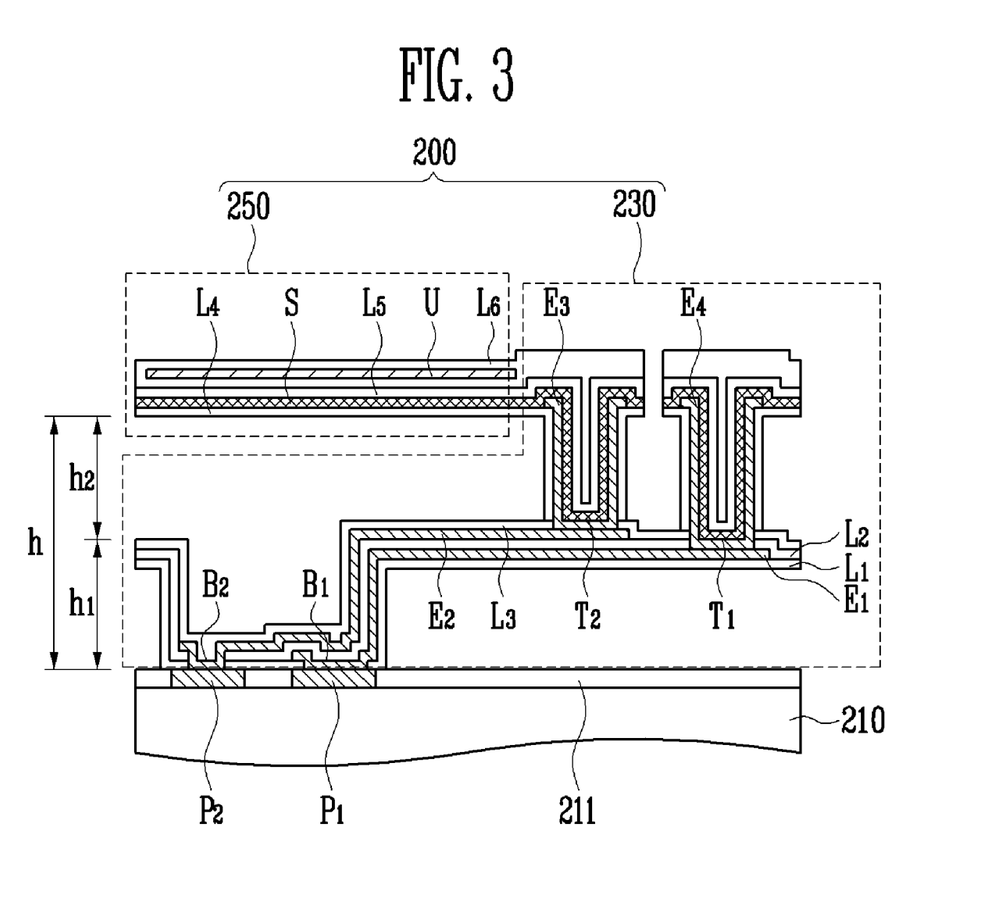
FIG. 3 is a cross-sectional view taken along lines A-A' and B-B' of FIG. 2.

FIG. 2 is a perspective view of a multilayer-structured bolometer according to an exemplary embodiment of the present invention, and FIG. 3 is a cross-sectional view taken along lines A-A' and B-B' of FIG. 2. In the drawings, $B_1$ and $B_2$ indicate regions where first and second metal pads $P_1$ and $P_2$ on a substrate 210 are electrically connected with a support arm 230, and $T_1$ and $T_2$ indicate regions where a resistive layer S sensing a change in resistance caused by infrared absorption is electrically connected with the support arm 230.

Referring to FIGS. 2 and 3, the multilayer-structured bolometer includes a semiconductor substrate 210 including a detection circuit (not shown) therein, first and second metal pads $P_1$ and $P_2$ formed on the semiconductor substrate 210, and a sensor structure 200 disposed apart from the surfaces of the first and second metal pads $P_1$ and $P_2$ by a quarter of an infrared wavelength λ above the semiconductor substrate 210. Here, λ denotes an infrared wavelength to be sensed and is generally 8 to 12 μm.

The substrate 210 may be formed of semiconductor Si, and the detection circuit is formed of Complementary Metal-Oxide Semiconductor (CMOS) in the substrate 210.

An insulating layer 211 is formed on the substrate 210, and the first and second metal pads $P_1$ and $P_2$ are formed in partial regions of the insulating layer 211.

Here, the first and second metal pads $P_1$ and $P_2$ may be electrically connected with the detection circuit formed in the substrate 210 and formed of Al.

The sensor structure 200 is divided into the support arm 230 and a body 250.

The support arm 230 is constituted to have a two-layer structure of an upper stage and a lower stage, and heights of the upper and lower stages are $h_1$ and $h_2$, respectively.

The lower stage of the support arm 230 includes first and second electrodes $E_1$ and $E_2$ respectively connected with the first and second metal pads $P_1$ and $P_2$ and first to third insulating layers $L_1$, $L_2$ and $L_3$ for insulation between the first and second electrodes $E_1$ and $E_2$.

The upper stage of the support arm 230 includes the resistive layer S having a resistance varying according to a change in temperature caused when infrared rays are absorbed, fourth and fifth insulating layers $L_4$ and $L_5$ for insulating the resistive layer S, and third and fourth electrodes $E_3$ and $E_4$ for respectively transferring a change in the resistance of the resistive layer S to the first and second electrodes $E_1$ and $E_2$.

The body 250 includes an absorption layer U surrounded by a sixth insulating layer $L_6$ and absorbing infrared rays, the resistive layer S having a resistance varying according to a change in temperature caused when infrared rays are absorbed, and the fourth and fifth insulating layers $L_4$ and $L_5$ for insulating the resistive layer S.

Here, the resistive layer S may be formed of a material having a resistance varying according to a change in temperature, for example, one of Si, $VO_x$ and Ti, and the fourth to sixth insulating layers $L_4$, $L_5$ and $L_6$ may be formed of $SiO_2$ or $Si_3N_4$.

In the above described multilayer-structured bolometer according to an exemplary embodiment of the present invention, the number of the support arms 230 supporting the body 250 of the sensor structure 200 is reduced to one, two electrical connections with the substrate 210 are enabled through the only one support arm 230, and thus the thermal conductivity of the sensor structure 200 is considerably reduced. Therefore, it is possible to remarkably improve sensitivity to temperature.

In addition, the multilayer-structured bolometer according to an exemplary embodiment of the present invention uses the only one support arm 230, and thus its pixel size is reduced. Therefore, it is possible to obtain high-resolution thermal images.

Furthermore, in the multilayer-structured bolometer according to an exemplary embodiment of the present invention, the absorbing layer U can be formed sufficiently large according to a characteristic of multilayer-structured bolometers, and thus a high fill-factor can be achieved. Therefore, it is possible to improve infrared absorbance.

Meanwhile, this exemplary embodiment has a structure including the absorption layer U when the resistive layer S is formed of Si. However, when the resistive layer S is formed of $VO_x$ or Ti, the resistive layer S functions to absorb infrared rays, and thus the absorption layer U can be omitted.

Figure 4:
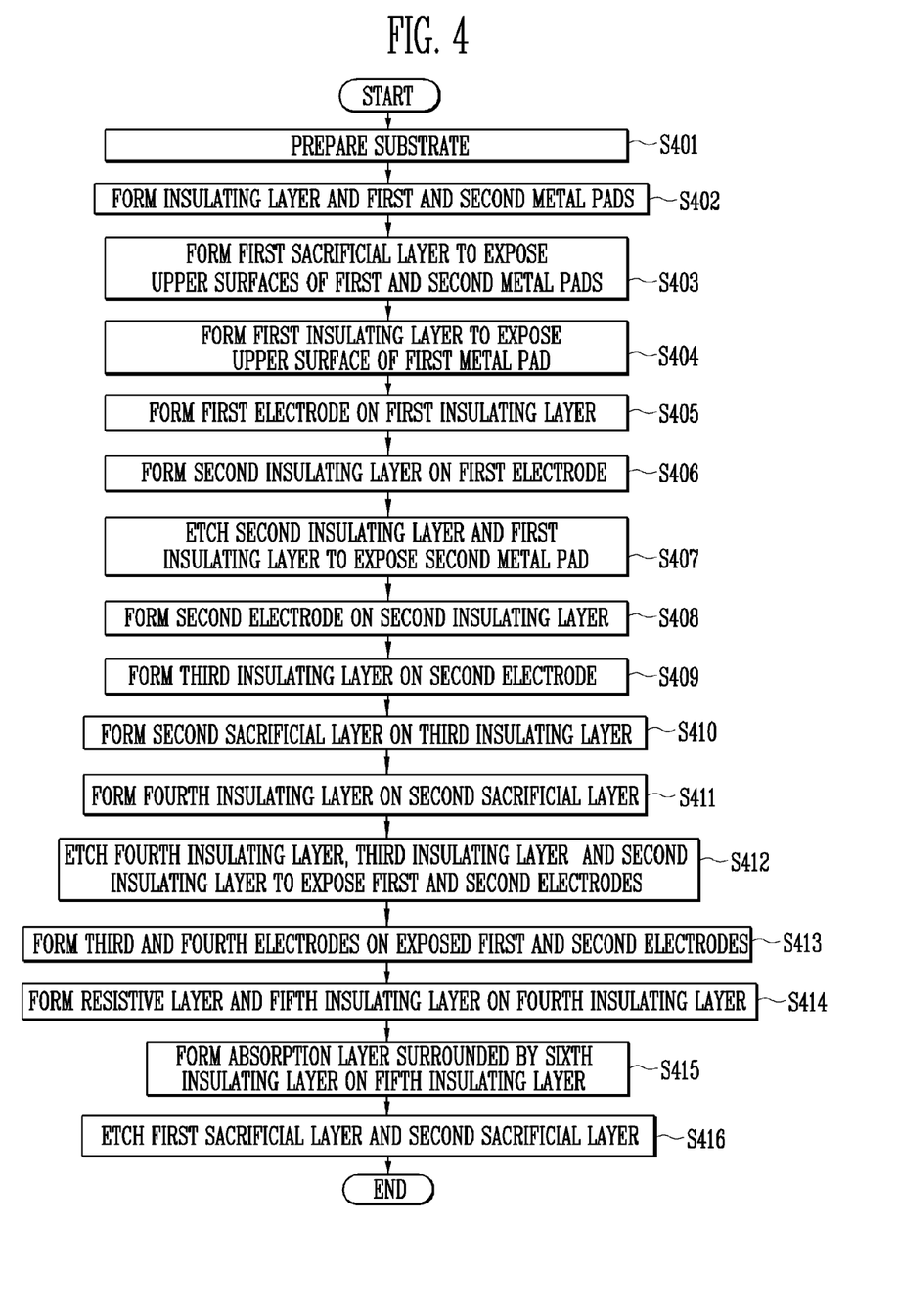
FIG. 4 is a flowchart illustrating a method of fabricating a multilayer-structured bolometer according to an exemplary embodiment of the present invention.

FIG. 4 is a flowchart illustrating a method of fabricating a multilayer-structured bolometer according to an exemplary embodiment of the present invention, and FIGS. 5A to 5F are cross-sectional views illustrating a method of fabricating a bolometer according to an exemplary embodiment of the present invention.

The fabrication process of FIGS. 5A to 5F will be described below on the basis of the flowchart of FIG. 4.

Figure 5A:
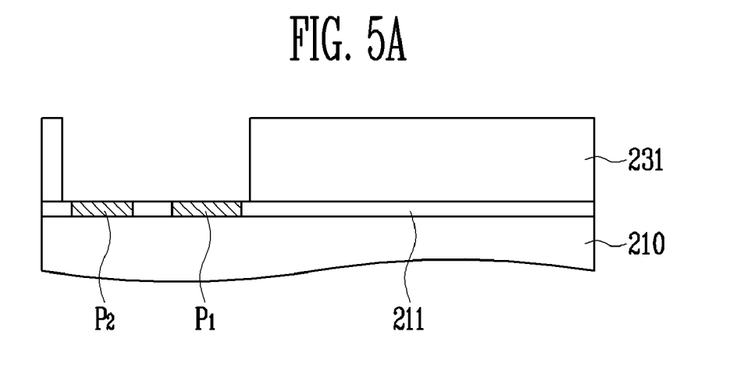
FIGS. 5A to 5F are cross-sectional views illustrating a method of fabricating a bolometer according to an exemplary embodiment of the present invention.

Referring to FIG. 5A, a substrate 210 including a CMOS detection circuit (not shown) therein is prepared (step 401). An insulating layer 211 is formed on the substrate 210, and then first and second metal pads $P_1$ and $P_2$ are formed in partial regions of the insulating layer 211 (step 402).

Subsequently, a first sacrificial layer 231 is formed on the insulating layer 211 to expose upper surfaces of the first and second metal pads $P_1$ and $P_2$ (step 403). The first sacrificial layer 231 will be removed in the following process, and may be formed of Benzocyclobutene (BCB) or polyimide.

Figure 5B:
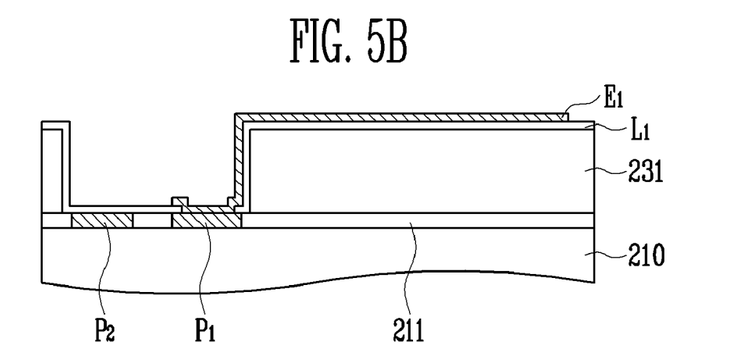

Referring to 5B, a first insulating layer $L_1$ is formed on the first sacrificial layer 231 to expose the upper surface of the first metal pad $P_1$ (step 404).

Subsequently, a first electrode $E_1$ is formed on the first insulating layer $L_1$ to contact with the exposed first metal pad $P_1$ (step 405). Here, the first electrode $E_1$ is not formed on the second metal pad $P_2$ and may be formed at least to the region $T_1$ as shown in FIGS. 2 and 3.

Figure 5C:
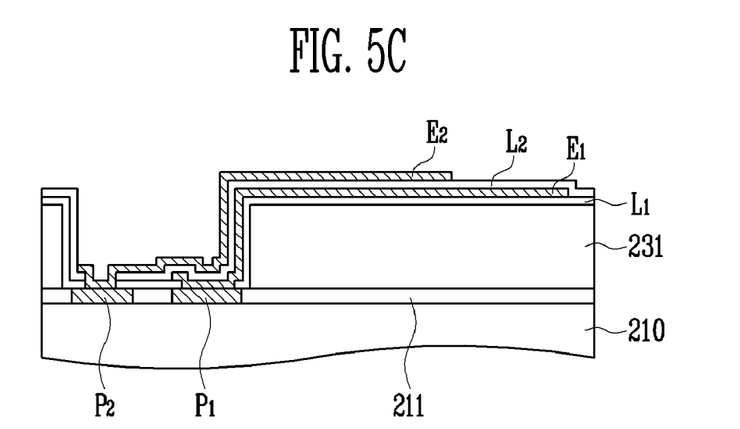

Referring to FIG. 5C, a second insulating layer $L_2$ is formed on the first electrode $E_1$ (step 406), and then the second insulating layer $L_2$ and the first insulating layer $L_1$ are etched to expose the second metal pad $P_2$ (step 407).

Subsequently, a second electrode E2 is formed on the second insulating layer $L_2$ to contact with the exposed second metal pad $P_2$ (step 408). Here, the second electrode $E_2$ may be formed at least to the region $T_2$ as shown in FIGS. 2 and 3.

Figure 5D:
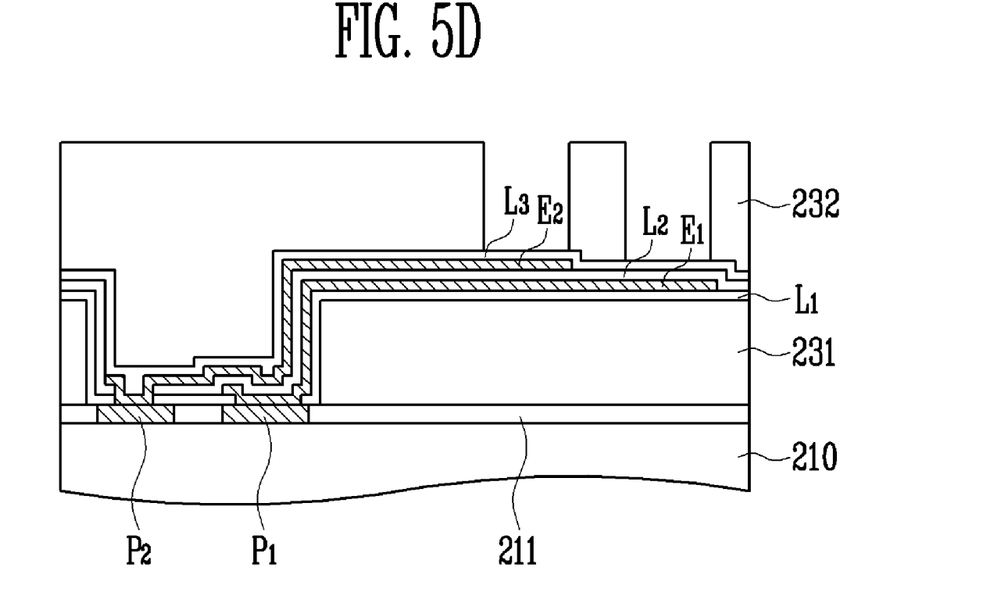

Referring to FIG. 5D, a third insulating layer $L_3$ is formed on the second electrode $E_2$ (step 409). Then, a second sacrificial layer 232 is formed on the third insulating layer $L_3$ to expose the regions $T_1$ and $T_2$ (step 410).

Here, the second sacrificial layer 232 will be removed in the following process, and may be formed of BCB or polyimide.

Figure 5E:
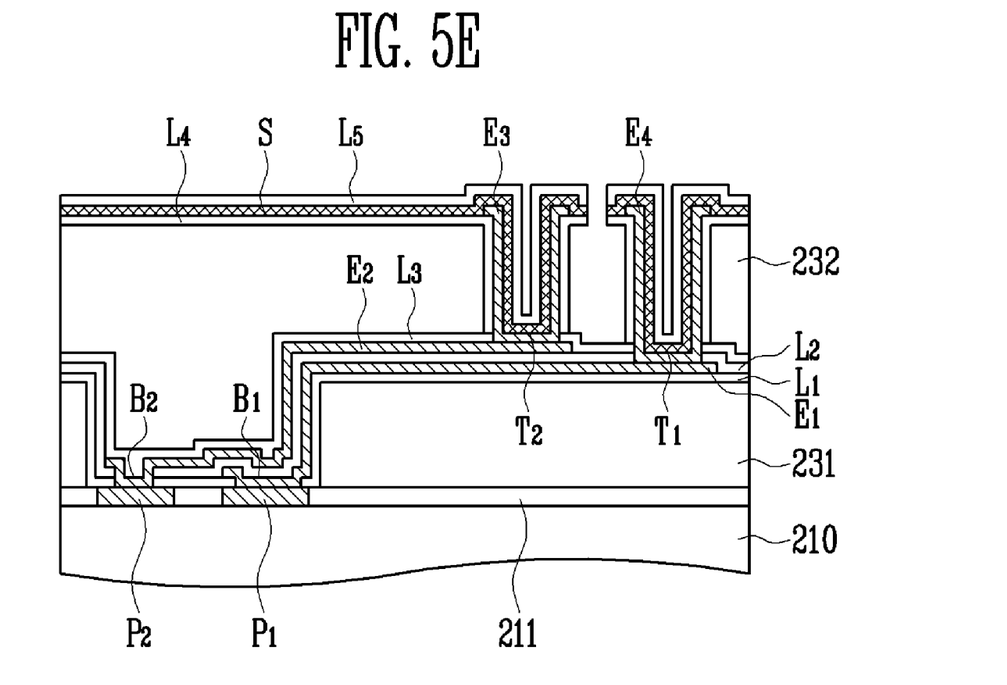

Referring to FIG. 5E, a fourth insulating layer $L_4$ is formed on the second sacrificial layer 232 (step 411), and then the fourth insulating layer $L_4$, the third insulating layer $L_3$ and the second insulating layer $L_2$ are etched to expose the first and second electrodes $E_1$ and $E_2$ (step 412).

Subsequently, the third and fourth electrodes $E_3$ and $E_4$ are formed on the exposed first and second electrodes $E_1$ and $E_2$, respectively (step 413).

Then, a resistive layer S and a fifth insulating layer $L_5$ are formed on the fourth insulating layer $L_4$ (step 414).

Here, the resistive layer S may be formed of a material having a resistance varying according to a change in temperature, for example, one of Si, $VO_x$ or Ti.

Figure 5F:
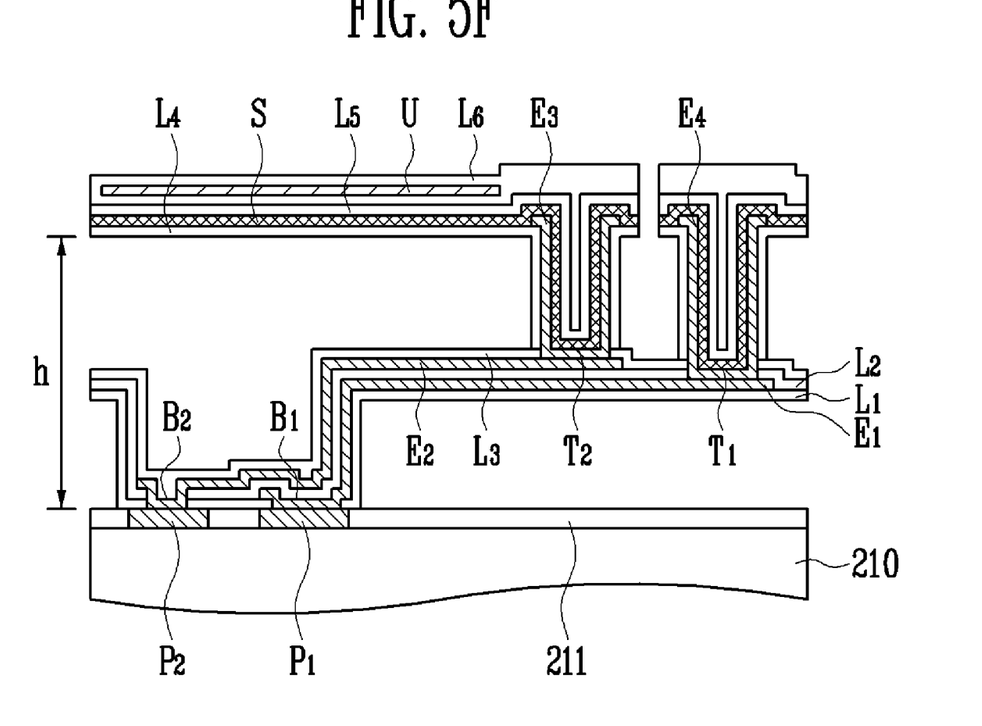

Referring to FIG. 5F, an absorption layer U surrounded by a sixth insulating layer $L_6$ is formed on the fifth insulating layer $L_5$ by a general method (step 415). Here, the absorption layer U is formed in a body 250 only. Subsequently, the first sacrificial layer 231 and the second sacrificial layer 232 are etched (step 416), and thereby a space h corresponding to the entire thickness of the first and second sacrificial layers 231 and 232 is formed between the substrate 210 and a sensor structure 200.

According to the above described fabrication process, it is possible to obtain a structure in which the body of the sensor structure 200 is electrically connected with the substrate 210 through the one support arm 230 having a two-layer structure. Therefore, the thermal conductivity of the sensor structure 200 is considerably reduced, and thus a bolometer having a remarkably improved sensitivity to temperature can be fabricated. In addition, when an infrared-absorbing layer is formed sufficiently large, it is possible to fabricate a bolometer having an improved infrared absorbance due to a high fill-factor.

The present invention has the following effects.

First, the number of support arms supporting the body of a sensor structure is reduced to one, and the sensor structure is electrically connected with a substrate through the only one support arm. Therefore, the thermal conductivity of the sensor structure is considerably reduced, and it is possible to remarkably improve sensitivity to temperature.

Second, according to a characteristic of a multilayer-structured bolometer, an infrared-absorbing layer can be formed sufficiently large, and thus a high fill-factor can be achieved. Therefore, it is possible to improve infrared absorbance.

Third, since the number of support arms supporting the sensor structure can be reduced to one, the pixel size of a bolometer is reduced to obtain high-resolution thermal images. Therefore, it is possible to reduce the volume, weight and price of an infrared camera.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A multilayer-structured bolometer which comprises a semiconductor substrate including a detection circuit therein, first and second metal pads formed on the semiconductor substrate, and a sensor structure disposed apart from the first and second metal pads by a quarter of an infrared wavelength above the semiconductor substrate, the sensor structure comprising:

a body disposed above the first and second metal pads, and including a resistive layer having a resistance varying according to a change in temperature caused when infrared rays are absorbed; and one support arm constituted to have a two-layer structure of an upper stage and a lower stage that are directly connected with each other, thereby forming a single unitary support arm, the lower stage being directly connected with both the first and second pads, the upper stage being directly connected with the body.

2. The multilayer-structured bolometer of claim 1, wherein the first and second metal pads are electrically connected with the detection circuit of the substrate.

3. The multilayer-structured bolometer of claim 1, wherein the lower stage of the support arm comprises:

first and second electrodes respectively connected with the first and second metal pads; and first to third insulating layers for insulation between the first and second electrodes.

4. The multilayer-structured bolometer of claim 3, wherein the upper stage of the support arm comprises:

the resistive layer having a resistance varying according to a change in temperature caused when infrared rays are absorbed;

fourth and fifth insulating layers for insulating the resistive layer; and third and fourth electrodes for respectively transferring a change in the resistance of the resistive layer to the first and second electrodes.

5. The multilayer-structured bolometer of claim 4, wherein the body further comprises the fourth and fifth insulating layers for insulating the resistive layer.

6. The multilayer-structured bolometer of claim 1, wherein the resistive layer is formed of one of Si, $VO_x$ or Ti.

7. The multilayer-structured bolometer of claim 6, wherein the body further comprises an absorption layer for absorbing infrared rays when the resistive layer is formed of Si.

8. The multilayer-structured bolometer of claim 1, wherein the lower stage proceeds along a top surface of the semiconductor substrate without discontinuity.

9. A method of fabricating a multilayer-structured bolometer, comprising:

forming first and second metal pads on a substrate including a detection circuit;

forming a first sacrificial layer on the substrate to expose the first and second metal pads, and then forming first and second electrodes electrically connected with the first and second metal pads and forming a first insulating layer, a second insulating layer and a third insulating layer for insulating the first and second electrodes on the first sacrificial layer, the second insulating layer being sandwiched between the first and second electrodes, forming a second sacrificial layer on the third insulating layer to expose a region to be connected with a body of a sensor structure, and then forming on the second sacrificial layer a resistive layer having a resistance varying according to a change in temperature caused when infrared rays are absorbed, fourth and fifth insulating layers for insulating the resistive layer, and third and fourth electrodes for respectively transferring a change in the resistance of the resistive layer to the first and second electrodes; and etching the first sacrificial layer and the second sacrificial layer.

10. The method of claim 9, wherein the forming of the first and second metal pads further comprises forming an insulating layer on the substrate, and then forming the first and second metal pads on partial regions of the insulating layer.

11. The method of claim 9, wherein the forming of the first sacrificial layer further comprises:

forming the first sacrificial layer on the substrate to expose upper surfaces of the first and second metal pads;

forming the first insulating layer on the first sacrificial layer to expose the upper surface of the first metal pad;

forming the first electrode having a first portion and a second portion, the first portion of the first electrode being formed on the exposed first metal pad to be in direct contact with the exposed first metal pad, the second portion of the first electrode formed on the first insulating layer to be in direct contact with the first insulating layer;

forming the second insulating layer on the first electrode, and then etching a portion of the first and second insulating layers to expose the second metal pad;

forming the second electrode having a first portion and a second portion, the first portion of the second electrode being formed on the exposed second metal pad to be in direct contact with the exposed second metal pad, the second portion of the second electrode being formed on the second insulating layer to be in direct contact with the second insulating layer; and forming the third insulating layer on the second electrode.

12. The method of claim 9, wherein the forming of the second sacrificial layer further comprises:

forming the second sacrificial layer on the third insulating layer to expose the region to be connected with the body of the sensor structure;

forming the fourth insulating layer on the second sacrificial layer, and then etching the second to fourth insulating layers to expose the first and second electrodes;

forming the third and fourth electrodes on the exposed first and second electrodes; and forming the resistive layer on the fourth insulating layer, and then forming the fifth insulating layer on the resistive layer.

13. The method of claim 9, wherein the substrate is formed of semiconductor Si.

14. The method of claim 9, wherein the first and second metal pads are formed of Al.

15. The method of claim 9, wherein the resistive layer is formed of one of Si, $VO_x$, or Ti having resistances varying according to a change in temperature.

16. The method of claim 15, wherein when the resistive layer is formed of Si, the method further comprises forming an absorption layer surrounded by a sixth insulating layer on the fifth insulating layer after forming the second sacrificial layer and before etching the first sacrificial layer and the second sacrificial layer.

17. The method of claim 9, wherein the first and second sacrificial layers are formed of Benzocyclobutene (BCB) or polyimide.

18. The method of claim 9, wherein the first electrode is in direct contact with a lower surface of the second insulating layer, and the second electrode is in direct contact with an upper surface of the second insulating layer.

* * * * *